(12) United States Patent
Chisholm et al.

(10) Patent No.: US 9,672,361 B2
(45) Date of Patent: Jun. 6, 2017

(54) SELF-SERVICE TERMINAL (SST) SECURE BOOT

(71) Applicant: NCR Corporation, Duluth, GA (US)

(72) Inventors: Gordon Chisholm, Perth (GB); Kevin Horgan, Dundee (GB); Campbell Benn, Dundee (GB)

(73) Assignee: NCR Corporation, Duluth, GA (US)

( * ) Notice: Subject to any disclaimer, the term of this patent is extended or adjusted under 35 U.S.C. 154(b) by 43 days.

(21) Appl. No.: 14/265,603

(22) Filed: Apr. 30, 2014

(65) Prior Publication Data
US 2015/0317168 A1 Nov. 5, 2015

(51) Int. Cl.
*G06F 21/57* (2013.01)
*G06F 9/44* (2006.01)

(52) U.S. Cl.
CPC ............ *G06F 21/575* (2013.01); *G06F 9/441* (2013.01); *G06F 9/442* (2013.01); *G06F 9/4415* (2013.01); *G06F 21/572* (2013.01)

(58) Field of Classification Search
CPC ...... G06F 21/572; G06F 21/575; G06F 9/441; G06F 9/442; G06F 9/4415
See application file for complete search history.

(56) References Cited

U.S. PATENT DOCUMENTS

| | | | | |
|---|---|---|---|---|
| 5,844,986 A * | 12/1998 | Davis | ........................... | 713/187 |
| 6,185,678 B1 * | 2/2001 | Arbaugh | ............... | G06F 21/575 713/2 |
| 6,625,729 B1 * | 9/2003 | Angelo | ................. | G06F 9/4401 711/E12.1 |
| 6,735,696 B1 * | 5/2004 | Hannah | .................... | G06F 21/10 705/59 |
| 7,849,011 B1 * | 12/2010 | McCoy | ................. | G06F 21/575 705/35 |
| 8,239,688 B2 * | 8/2012 | De Atley | ................ | G06F 21/51 709/219 |
| 2002/0166072 A1 * | 11/2002 | Cromer et al. | ................ | 713/202 |
| 2003/0084307 A1 * | 5/2003 | Schwartz | .............. | G06F 9/4406 713/189 |
| 2004/0044899 A1 * | 3/2004 | Gaya | ........................ | H04L 29/06 713/193 |
| 2005/0074147 A1 * | 4/2005 | Smith | ................. | G06K 9/00013 382/115 |
| 2006/0026423 A1 * | 2/2006 | Bangerter | ............. | H04L 9/3218 713/164 |
| 2006/0136708 A1 * | 6/2006 | Hajji | ...................... | G06F 21/575 713/2 |
| 2006/0169764 A1 * | 8/2006 | Ross et al. | ..................... | 235/375 |
| 2006/0236122 A1 * | 10/2006 | Field | ..................... | G06F 21/575 713/187 |
| 2007/0110408 A1 * | 5/2007 | Chang et al. | .................. | 386/126 |
| 2007/0117634 A1 * | 5/2007 | Hamilton et al. | ............... | 463/42 |
| 2007/0192610 A1 * | 8/2007 | Chun | ..................... | G06F 21/64 713/176 |

(Continued)

*Primary Examiner* — Joseph P Hirl
*Assistant Examiner* — Stephen Gundry
(74) *Attorney, Agent, or Firm* — Schwegman, Lundberg & Woessner

(57) ABSTRACT

A Basic Input/Output System (BIOS) of a device is modified to: obtain a first value from a medium interfaced to the device, produce a second value from boot data resident on the medium, compare the first value to the second value, and boot from the boot data of the medium when the first value is equal to the second value.

3 Claims, 4 Drawing Sheets

(56) References Cited

U.S. PATENT DOCUMENTS

| | | | |
|---|---|---|---|
| 2007/0198838 A1* | 8/2007 | Nonaka et al. | 713/176 |
| 2008/0077807 A1* | 3/2008 | Hicks | G06F 21/57 713/193 |
| 2008/0104381 A1* | 5/2008 | Peacock | G06F 21/30 713/1 |
| 2008/0104701 A1* | 5/2008 | Peacock | G06F 9/4401 726/22 |
| 2008/0114976 A1* | 5/2008 | Dandekar | G06F 9/441 713/2 |
| 2008/0300038 A1* | 12/2008 | Sylla | 463/16 |
| 2009/0064125 A1* | 3/2009 | Venkatachalam | G06F 8/65 717/170 |
| 2009/0306954 A1* | 12/2009 | Lee | G06F 11/2284 703/21 |
| 2010/0062844 A1* | 3/2010 | Crowder, Jr. | G06F 21/57 463/29 |
| 2010/0082960 A1* | 4/2010 | Grobman et al. | 713/2 |
| 2011/0126023 A1* | 5/2011 | Wang et al. | 713/182 |
| 2011/0131401 A1* | 6/2011 | Singh | G06F 21/31 713/2 |
| 2011/0131447 A1* | 6/2011 | Prakash | G06F 21/572 714/19 |
| 2011/0154481 A1* | 6/2011 | Kilgore | G06F 21/31 726/19 |
| 2011/0296194 A1* | 12/2011 | Herkes | G06F 21/34 713/185 |
| 2012/0151219 A1* | 6/2012 | Ryu et al. | 713/185 |
| 2012/0239917 A1* | 9/2012 | Springfield | G06F 21/575 713/2 |
| 2014/0040605 A1* | 2/2014 | Futral | G06F 9/445 713/2 |
| 2014/0068238 A1* | 3/2014 | Jaber | G06F 21/575 713/2 |
| 2014/0095886 A1* | 4/2014 | Futral | G06F 21/572 713/187 |
| 2014/0101426 A1* | 4/2014 | Senthurpandi | G06F 21/32 713/2 |
| 2014/0149286 A1* | 5/2014 | Forsyth | G07F 19/20 705/43 |
| 2014/0237226 A1* | 8/2014 | Berlin | G06F 9/4411 713/2 |
| 2014/0298032 A1* | 10/2014 | Crowder, Jr. | H04L 9/3247 713/176 |
| 2014/0317350 A1* | 10/2014 | Langas | G06F 3/0626 711/115 |
| 2014/0365755 A1* | 12/2014 | Liu | G06F 21/572 713/2 |
| 2015/0012738 A1* | 1/2015 | Shah | G06F 21/575 713/2 |
| 2015/0095158 A1* | 4/2015 | Nasserbakht | G06Q 10/109 705/14.58 |
| 2015/0161392 A1* | 6/2015 | Krummel | G06F 21/554 726/22 |
| 2015/0193620 A1* | 7/2015 | Khatri | G06F 21/575 713/2 |
| 2016/0188347 A1* | 6/2016 | Berlin | G06F 9/4411 713/2 |

* cited by examiner

SELF-SERVICE TERMINAL (SST) SECURE BOOT

BACKGROUND

Increasingly, enterprises are deploying Self-Service Terminals (SSTs) at various locations for use by consumers. The locations can include financial institutions, grocery stores, retail stores, government venues, entertainment venues, gaming venues, transportation venues, and the like.

One type of SST is an Automated Teller Machine (ATM). ATMs present unique changes to a servicing enterprise because security is of utmost concern. In fact, network access to the network, which the ATM communicates with for financial transactions, is often unavailable for access to servicing engineers. As a result, most service for ATMs occurs in person, where the service personnel are physically present at the ATM.

Still security is a major issue for ATMs. One technique recently used to circumvent ATM security entails inserting a boot disk in a device port of the ATM to reboot the ATM from the boot image on the boot disk. This is particularly prevalent with ATM's having the Windows™ operating system. The rogue boot on the boot disk replaces key applications on the ATM and exposes the ATM to being depleted of cash.

Adding passwords to the BIOS of the ATM, such that the BIOS is essentially locked down, is possible. But this is an unworkable solution, since the BIOS passwords cannot be changed remotely and without changing the passwords a bigger security issue would surface should a password be exposed or compromised. Manually visiting each ATM to change the passwords periodically or when one ATM is compromised would create undue hardships on the organization that services the ATMs.

SUMMARY

In various embodiments, methods and a Self-Service Terminal (SST) for SST boots are presented.

According to an embodiment, a method secure device boot is provided. Specifically, header information from a portable non-transitory computer-readable storage medium is obtained and a value is removed from the header information. Next, the value is compared against a generated value produced by processing data on the non-transitory computer readable storage medium.

DETAILED DESCRIPTION

Figure 1:
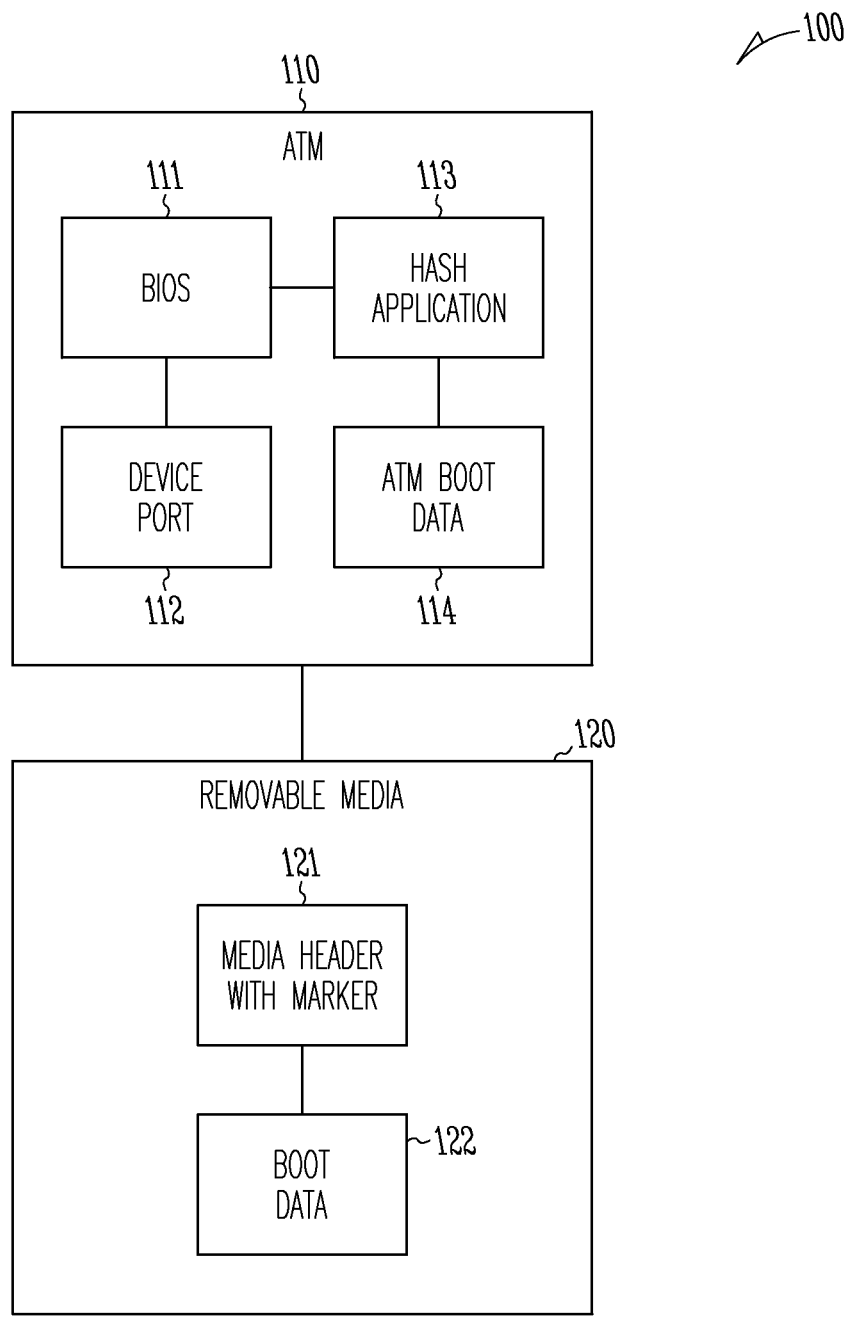
FIG. 1 is a diagram of components for practicing secure Self-Service Terminal (SST) boots, according to an example embodiment.

FIG. 1 is a diagram 100 of components for practicing secure Automated Teller Machine (ATM) boots, according to an example embodiment. It is to be noted that the ATM 110 is shown schematically in greatly simplified form, with only those components relevant to understanding of this embodiment being illustrated. The same situation may be true for the removable media 120.

Furthermore, the various components (that are identified in the FIG. 1) are illustrated and the arrangement of the components is presented for purposes of illustration only. It is to be noted that other arrangements with more or less components are possible without departing from the teachings of the secure ATM boots, presented herein and below.

Furthermore, methods and SST presented herein and below for secure device boots can be implemented in whole or in part in one, all, or some combination of the components shown with the diagram 100. The methods are programmed as executable instructions in memory and/or non-transitory computer-readable storage media and executed on one or more processors associated with the components.

Specifically, the diagram 100 permits secure ATM boot-ups (boots—restarting the ATM and loading the Operating System (OS) and other software resources executed on the ATM) utilizing removable media 120 to transfer boot data to and from the ATM for purposes of authenticating the boot data of the removable media 120. The details of this approach in view of the components, within the diagram 100, are now presented with reference to an embodiment of the FIG. 1 within the context of an ATM 110.

However, before discussion of the diagram 100 is presented, it is to be noted that the methods and SST presented herein are not limited to ATM solutions; that is, any SST terminal (kiosk, vending machine, check-in and/or check-out terminal, such as those used in retail, hotel, car rental, healthcare, or financial industries, etc.) or that matter any processing device for any industry can benefit from the secure device boots discussed herein, including devices that lack a network connection entirely.

The diagram 100 includes an ATM 110 and a Compact Disk (CD) 120. The ATM includes a Basic Input/Output System (BIOS) 111, a device port 112, a hash application 113, and ATM boot data 114 (may also be referred to herein as "boot image"). The CD 120 includes a media header with a marker 121 and boot data 122.

The techniques and features of secure ATM boots are illustrated with reference to the components of the diagram 100 for the ATM 110 for purposes of some individual present at the ATM 110 attempting to boot the ATM 110 up using the boot data 122 of the CD 120.

When the ATM 110 is powered up after shut down or when a hard rest action is detected (such as through an authorized command at the ATM 110 or through a failure or error situation necessitating a restart or boot), the BIOS 111 is executed by the ATM 110. If the BIOS 111 detects the presence of the removable media 120 interfaced to the device port 112, the BIOS 111 may boot from the boot data 122, if present on the CD 120, and override booting from the ATM boot data 114.

As discussed above, this can create a security hole for the ATM 110 when the boot data 122 is corrupted and not authenticated. This could result in different applications and security enforcement for those applications when installed from the boot data 122 on the ATM 110. Any such situation could result in the ATM 110 being drained of cash.

The CD 120 includes a media header that typically includes a small amount of data that describes the boot data 122 resident on the CD 120. Such a media header is enhanced herein as the media header with marker 121 and hereinafter referred to as just media header 121. The media header 121 includes a marker within a predefined field of the media header 121.

The marker is a hash value obtained by using a hashing algorithm against some or all of the boot data 122. This provides a type of digital signature for the boot data 122, such that should the boot data 122 be altered, the hash value in the media header 121 cannot be reproduced using the altered boot data. The hash value is provided in the media header 121 when the boot data 122 is written to the CD 120.

In an embodiment, the hash value is based off the Logical Volume Integrity Descriptor (LVID) data provided with the boot data 122 of associated with the media header 121.

In an embodiment, the hash value is also encrypted.

In an embodiment, the hash value is encrypted using a triple Data Encryption Standard (DES) cryptographic algorithm.

In an embodiment, the hash value is encrypted with a public key of the ATM 110, such that it can only be decrypted with the private key of the ATM 110, which resides in secure storage of the ATM 110.

When the BIOS 111 is activated on a boot condition (power up, hard reset, or soft reset (user initiated with the proper security), the BIOS 111 detects the CD 120 having the boot data 122. Typically, this would result in conventional BIOS booting of an ATM with the boot data; however this typical BIOS operation is modified and enhanced herein to perform the following novel techniques.

The BIOS 111 acquires the hash value from the media header 121. Next, the BIOS 111 inspects the media header 121 and/or the boot data 122 based on what is expected by the hash application 113 (this is a different instance of a same hash application used to initially create the hash value hidden within the media header 121 when the boot data 122 was written to the CD 120). The BIOS 111 then obtains the information from the CD 120 for the hash application 113 and supplies that information to the hash application 113.

In an embodiment, the BIOS 111 uses the media header 121 as input to the hash application 113 to generate the hash value produced on the ATM 110. In an embodiment, the BIOS 111 uses LVID data obtained from the CD 120 as input to the hash application 113. In an embodiment, the BIOS 111 uses predefined offsets to acquire a sampling of data from the boot data 122 as input to the hash application 113. In an embodiment, the BIOS 111 uses one or more combinations of the above-discussed embodiments as input to the hash application 113. In fact a variety of data sampling techniques can be used herein as long as the data sampling used by the BIOS 111 matches that what was used to produce the hash value present in the media header 121.

In an embodiment, the hash value is located in a reserved but available hidden field in the media header 121.

In an embodiment, the media header 121 also includes volume descriptors, partition tables, allocation tables, and the like along with the hash value in a reserved but available field of the media header 121.

The hash application 113 returns a newly generated hash value (produced on the ATM 110) to the BIOS 111. The BIOS 111 then compares the hash value against its independently generated hash value.

When the hash value is equal to the generated hash value, the BIOS 111 is assured that the boot data 122 is authenticated and can be used to boot the ATM 110. In an embodiment, when the generated hash value produced on the ATM 110 matches the hash value in the media header 121, the BIOS 111 replaces the boot data 114 with the boot data 122 within the ATM 110.

When the hash value is not equal to the generated hash value, the BIOS 111 invalidates the boot data 122 for use in booting the ATM 110.

The BIOS 111 can be configured to take a variety of actions when the boot data 122 is invalidated. For example, the BIOS 111 may shut down the ATM 110 or the BIOS 111 can boot the ATM 110 using the ATM boot data 114. In another case, the BIOS 111 may temporarily activate a camera associated with the ATM 110 and take a picture or image of an area where an individual would be to access the ATM 110 before deciding whether to boot the ATM 110 with the ATM boot data 114 or whether to shut the ATM 110 down. The picture logged in storage on the ATM 110.

Figure 2:
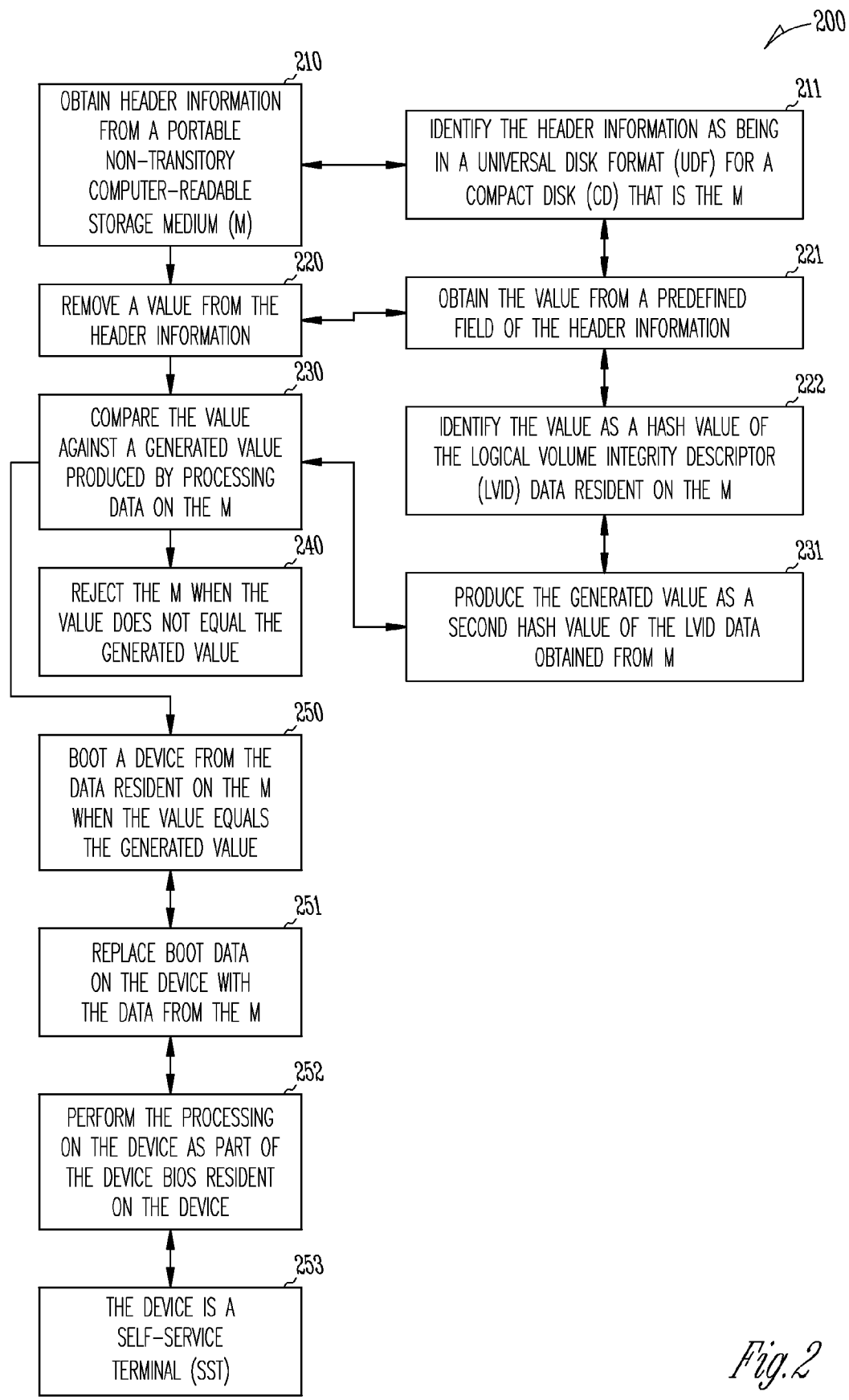
FIG. 2 is a diagram of a method for secure device boot, according to an example embodiment.
Figure 3:
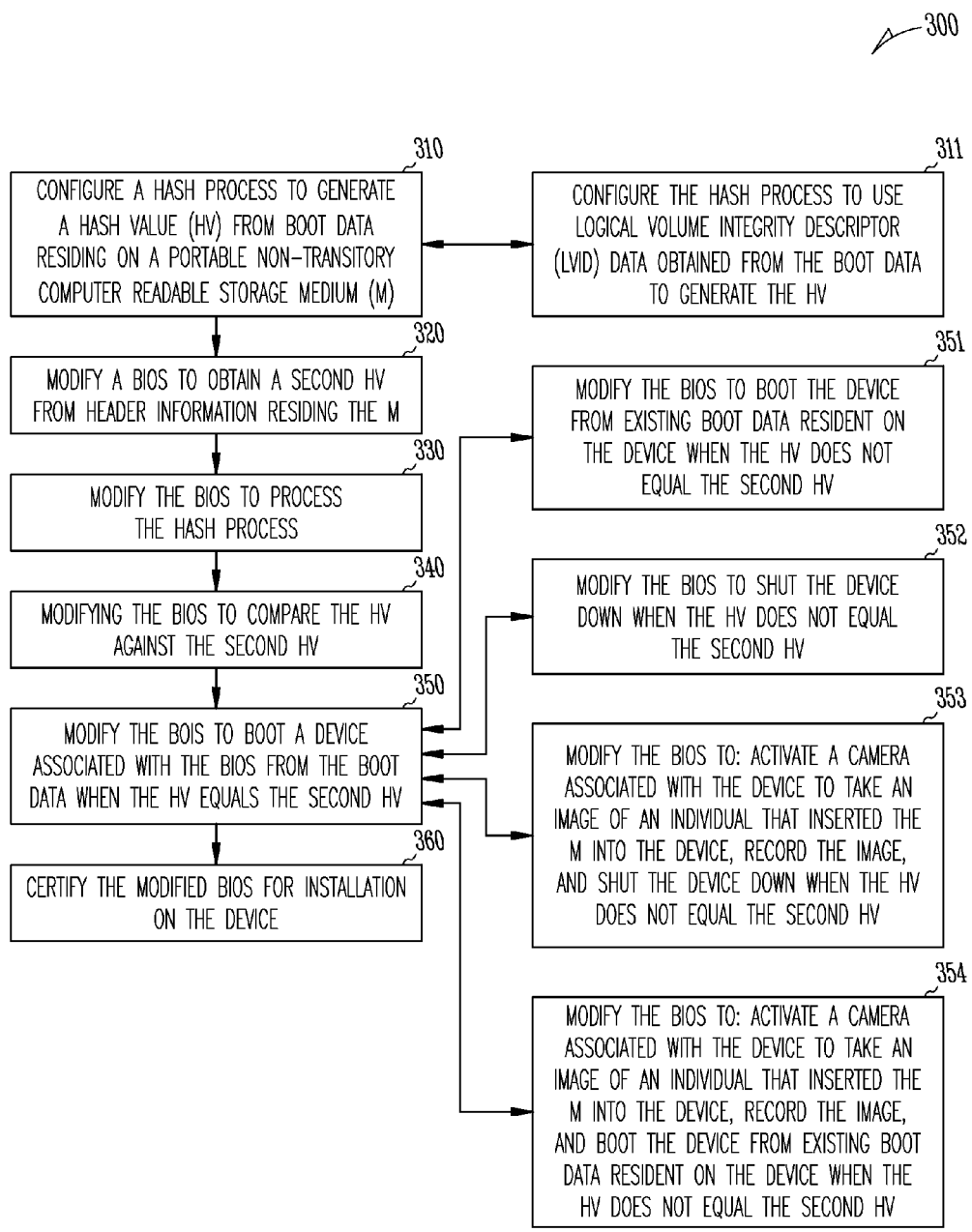
FIG. 3 is a diagram of a method for modifying and installing a Basic Input/Output System (BIOS) to perform secure device boot.
Figure 4:
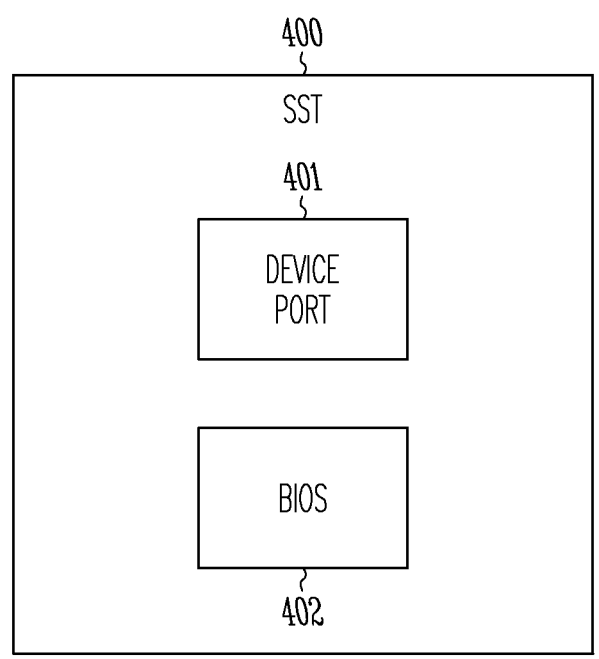
FIG. 4 is a diagram of a SST, according to an example embodiment.

Some embodiments of the diagram 100 and other embodiments of the secure device boots are now discussed with the descriptions of the FIGS. 2-4.

FIG. 2 is a diagram of a method 200 for secure device boot, according to an example embodiment. The software module(s) that implements the method 200 is referred to as a "secure boot manager." The secure boot manager is implemented as executable instructions programmed and residing within memory and/or a non-transitory computer-readable (processor-readable) storage medium and executed by one or more processors of a device. The processor(s) of the device that executes the SST automation manager are specifically configured and programmed to process the secure boot manager. The secure boot manager may or may not have access to one or more networks during its processing. Any such networks can be wired, wireless, or a combination of wired and wireless.

In an embodiment, the device that executes the secure boot manager is the ATM 110 of the FIG. 1.

In an embodiment, the device that executes the secure boot manager is a Self-Service Terminal (SST).

In an embodiment, the device that executes the secure boot manager is a kiosk.

In an embodiment, the device that executes the secure boot manager is a processor-enabled device.

In an embodiment, the secure boot manager is the BIOS 111 of the FIG. 1.

The processing of the secure boot manager assumes that a non-transitory computer readable storage medium is interfaced to a device that executes the secure boot manager when the device is restarted.

At 210, the secure boot manager obtains header information or header data from the portable non-transitory computer-readable storage medium (hereinafter referred to as "media.").

The media is removable and portable.

In an embodiment, the media is a CD.

In an embodiment, the media is a Digital Versatile Disk (DVD).

In an embodiment, the media resides on a Universal Serial Bus (USB) device.

In an embodiment, the media resides on a Secure Digital (SD) card.

According to an embodiment, at 211, the secure boot manager identifies the header information as being in a Universal Disk Format (UDF) for a CD that is the media.

At 220, the secure boot manager removes a value from the header information.

In an embodiment, the secure boot manager decrypts the value (the value originally in an encrypted format known to the secure boot manager).

According to an embodiment of 220 and 211, at 221, the secure boot manager obtains the value from a predefined field of the header information.

In an embodiment, the secure boot manager obtains the value from a predefined offset within the header information or based on a predefined tag associated with the value.

In an embodiment of 221 and at 222, the secure boot manager identifies the value as a hash value obtained from the LVID data resident on the media (in the header information, in a location within the media separate from the header information, or as part of boot data resident on the media).

At 230, the secure boot manager compares the value against a generated value produced by processing data on the media. The technique for acquiring the data off the media is configured within the processing of the secure boot manager.

In an embodiment of 230 and 222, at 231, the secure boot manager produces the generated value as a second hash value of the LVID data (as the data acquired off the media in 230).

In an embodiment, the hash value was produced by a hash algorithm, application or process based on boot data resident on the media. The secure boot manager uses a different executing instance of the same hash algorithm, application or process to produce the second hash value.

According to an embodiment, at 240, the secure boot manager rejects the media when the value does not equal the generated value. Indicating that boot data resident on the media is not capable of being authenticated by the secure boot manager.

In an embodiment, at 250, the secure boot manager boots a device that executes the secure boot manager from the data (which is boot data) resident on the media when the value equals the generated value.

In an embodiment of 250 and at 251, the secure boot manager replaces boot data resident on the device with the data (which is the boot data) from the media.

In an embodiment of 251 and at 252, the secure boot manager processes as part of the device BIOS resident on the device.

In an embodiment of 252 and at 253, the device is a SST (as was already mentioned above).

FIG. 3 is a diagram of a method 300 for modifying and installing a Basic Input/Output System (BIOS) to perform secure device boot. The software module(s) that implements the method 300 is referred to as a "BIOS configuration manager." The BIOS configuration manager is implemented as executable instructions programmed and residing within memory and/or a non-transitory computer-readable (processor-readable) storage medium and executed by one or more processors of device. The processors that execute the BIOS configuration manager are specifically configured and programmed to process the BIOS configuration manager. The BIOS configuration manager may or may not have access to one or more networks during its processing. Any such networks can be wired, wireless, or a combination of wired and wireless.

In an embodiment, the device that executes the BIOS configuration manager is a secure server.

In an embodiment, the BIOS configuration manager produces a modified BIOS, which is the secure boot manager of the FIG. 2.

At 310, the BIOS configuration manager configures a hash process to generate a hash value from boot data residing on a media.

In an embodiment, at 311, the BIOS configuration manager configures the hash process to use LVID data obtained from the boot data of the media to generate the hash value.

At 320, the BIOS configuration manager modifies a BIOS to obtain a second hash value from header information or header data resident on the media.

At 330, the BIOS configuration manager modifies the BIOS to process the hash process by obtaining selective portions of the boot data and supplying those selective portions as input to the hash process.

At 340, the BIOS configuration manager modifies the BIOS to compare the hash value against the second hash value.

At 350, the BIOS configuration manager modifies the BIOS to boot a device associated with the BIOS from the boot data when the hash value equals the second hash value.

According to an embodiment, at 351, the BIOS configuration manager modifies the BIOS to boot the device from existing boot data resident on the device with the hash value does not equal the second hash value.

In an embodiment, at 352, the BIOS configuration manager modifies the BIOS to shut down the device when the hash value does not equal the second hash value.

In an embodiment, at 353, the BIOS configuration manager modifies the BIOS to: activate a camera associated with the device to take an image of an individual that inserted the media into the device, record the image on the device, and shut down the device when the hash value does not equal the second hash value.

In an embodiment, at 354, the BIOS configuration manager modifies the BIOS to: activate a camera associated with the device to take an image of an individual that inserted the media into the device, record the image on the device, and boot the device from existing boot data resident on the device when the hash value does not equal the second hash value.

At 360, the BIOS configuration manager certifies the modified BIOS for installation on the device.

FIG. 4 is a diagram of a SST 400, according to an example embodiment. The components of the SST 400 are programmed and reside within memory and/or a non-transitory computer-readable medium and execute on one or more processors of the SST 400. The SST 400 may or may not have access and may or may not communicate over one or more networks; any such networks can be wired, wireless, or a combination of wired and wireless.

In an embodiment, the SST 400 is the ATM 110 of the FIG. 1.

In an embodiment, the SST 400 is a kiosk.

The SST 400 includes a device port 401 and a BIOS 402.

In an embodiment, the BIOS 402 is the BIOS 111 of the FIG. 1.

In an embodiment, the BIOS 402 is the secure boot manager of the FIG. 2.

In an embodiment, the BIOS 402 is the modified BIOS produced by the BIOS configuration manager of the FIG. 3.

The BIOS 402 is configured and adapted to: execute on the SST 400, obtain a first hash value from a media interfaced to the device port 401, generate a second hash value from boot data resident on the media, and boot the SST 400 when the first hash value equals the second hash value.

According to an embodiment, the BIOS 402 is further adapted and configured to boot the SST 400 from existing boot data resident on the SST 400 when the first hash value does not equal the second hash value.

In an embodiment, the BIOS 402 is further adapted and configured to shut down the SST 400 when the first value does not equal the second hash value.

In an embodiment, the device port 401 is a CD bay or drive.

In an embodiment, the device port 401 is a USB port.

In an embodiment, the device port 401 is a DVD bay or drive.

In an embodiment, the device port 401 is a SD slot.

In an embodiment, the media is a CD.

In an embodiment, the media is a DVD.

In an embodiment, the media is part of a USB device.

In an embodiment, the media is part of an SD card.

One now appreciates how secure device boot can occur from a non-transitory computer readable storage medium.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method, comprising:

configuring a hash process to generate a hash value from boot data residing on a portable non-transitory computer readable storage medium;

modifying a Basic Input/Output System (BIOS) to obtain a second hash value from header information residing on the portable non-transitory computer readable storage medium;

modifying the BIOS to process the hash process;

modifying the BIOS to compare the hash value against the second hash value;

modifying the BIOS to boot a device associated with the BIOS from the boot data when the hash value equals the second hash value, and wherein modifying the BIOS to boot further includes modifying the BIOS to: activate a camera associated with the device to take an image of an individual that inserted the portable non-transitory computer readable storage medium into the device, record the image, and shut the device down when the hash value does not equal the second hash value;

certifying the modified BIOS for installation on the device;

installing the modified BIOS as a device BIOS for the device; and processing on the device the modified BIOS for determining when to boot that device from data residing on the portable non-transitory computer readable storage medium when the device is booted and the portable non-transitory computer readable storage medium is interfaced to the device and booting the device from the data when the modified BIOS verifies the data as the boot data.

2. The method of claim 1, wherein configuring further includes configuring the hash process to use Logical Volume Integrity Descriptor (LVID) data obtained from the boot data to generate the hash value.

3. A method comprising:

configuring a hash process to generate a hash value from boot data residing on a portable non-transitory computer readable storage medium;

modifying a Basic Input/Output System (BIOS) to obtain a second hash value from header information residing on the portable non-transitory computer readable storage medium;

modifying the BIOS to process the hash process;

modifying the BIOS to compare the hash value against the second hash value;

modifying the BIOS to boot a device associated with the BIOS from the boot data when the hash value equals the second hash value, and wherein modifying the BIOS to boot further includes modifying the BIOS to: activate a camera associated with the device to take an image of an individual that inserted the portable non-transitory computer readable storage medium into the device, record the image, and boot the device from existing boot data resident on the device when the hash value does not equal the second hash value;

certifying the modified BIOS for installation on the device;

installing the modified BIOS as a device BIOS for the device; and processing on the device the modified BIOS for determining when to boot that device from data residing on the portable non-transitory computer readable storage medium when the device is booted and the portable non-transitory computer readable storage medium is interfaced to the device and booting the device from the data when the modified BIOS verifies the data as the boot data.

* * * * *